(12) United States Patent
Singh et al.

(10) Patent No.: US 12,058,005 B1
(45) Date of Patent: Aug. 6, 2024

(54) INTELLIGENT APPARATUS TO AUTO-GENERATE SPINE-LEAF NETWORK TOPOGRAPHY FOR DATACENTER LEVERAGING QUANTUM PHOTONIC GENERATIVE ARTIFICIAL INTELLIGENCE

(71) Applicant: Bank of America Corporation, Charlotte, NC (US)

(72) Inventors: Shailendra Singh, Maharashtra (IN); Maneesh Sethia, Telangana (IN); Saurabh Garg, Faridabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/243,901

(22) Filed: Sep. 8, 2023

(51) Int. Cl.
  *G06F 15/16* (2006.01)
  *H04L 9/00* (2022.01)
  *H04L 41/12* (2022.01)
  *H04L 41/16* (2022.01)

(52) U.S. Cl.
  CPC .............. *H04L 41/12* (2013.01); *H04L 9/50* (2022.05); *H04L 41/16* (2013.01)

(58) Field of Classification Search
  CPC ............ H04L 41/12; H04L 9/50; H04L 41/16
  See application file for complete search history.

(56) References Cited

U.S. PATENT DOCUMENTS

| 10,187,292 | B2 | 1/2019 | Ghobadi et al. |
| 10,374,872 | B2 | 8/2019 | Ratkovic et al. |
| 11,290,332 | B2 | 3/2022 | Mutnuru et al. |
| 11,678,093 | B2 | 6/2023 | Sagi et al. |
| 2019/0386913 | A1* | 12/2019 | Wei ........................ H04L 47/125 |
| 2020/0052786 | A1* | 2/2020 | Menard .............. G02B 6/29395 |
| 2020/0389477 | A1* | 12/2020 | Ambrosi ............... H04L 41/069 |

(Continued)

OTHER PUBLICATIONS

Sultan et al., Designing knowledge plane to optimize leaf and spine data center, arXiv:2009.08492v1 [cs.NI] Sep. 17, 2020, 3 pages.

(Continued)

*Primary Examiner* — Normin Abedin
(74) *Attorney, Agent, or Firm* — Banner & Witcoff, Ltd.

(57) ABSTRACT

Aspects of the disclosure relate to using machine learning models to automatically generate spine-leaf network topologies. A computing system may receive one or more prompts to generate a spine-leaf network topology based on a non-spine-leaf network topology of a non-spine-leaf network. Based on inputting the prompts into a natural language processing model, network criteria for generating the spine-leaf network topology may be generated. Non-spine-leaf network topology data comprising network metadata, network dependency parameters, and network constraint parameters, may be retrieved. Based on inputting the network criteria and the non-spine-leaf network data into a generative adversarial network implemented on a quantum computing device, candidate spine-leaf topologies comprising a qualified candidate spine-leaf network topology that meets the network criteria may be generated. A block of a blockchain may be generated and may comprise the qualified candidate spine-leaf network topology that meets the network criteria.

20 Claims, 7 Drawing Sheets

(56) References Cited

U.S. PATENT DOCUMENTS

2023/0261967 A1* 8/2023 Padi .................. H04L 45/04
 709/238

OTHER PUBLICATIONS

Okafor et al., "Leveraging Fog Computing for Scalable IoT Datacenter Using Spine-Leaf Network Topology," Journal of Electrical and Computer Engineering, vol. 2017, Article ID 2363240, 11 pages.
Jeremy L. O'Brien, "Optical Quantum Computing," arXiv:0803.1554v1 [quant-ph] Mar. 11, 2008, 5 pages.
Edmond Shami, "The Evolution of Decentralized ICT Networks," arXiv:1909.04434v1 [cs.NI] Sep. 10, 2019, 5 pages.

* cited by examiner

INTELLIGENT APPARATUS TO AUTO-GENERATE SPINE-LEAF NETWORK TOPOGRAPHY FOR DATACENTER LEVERAGING QUANTUM PHOTONIC GENERATIVE ARTIFICIAL INTELLIGENCE

TECHNICAL FIELD

Some aspects of the disclosure relate to using machine learning models implemented on quantum computing devices that are configured to automatically analyze the topology of non-spine-leaf computing networks in order to generate a spine-leaf network topology that may be used to deploy a spine-leaf network that provides improved performance, resiliency, redundancy, and/or security.

BACKGROUND

Computing networks may be configured in a variety of different ways that may depend on the types of tasks for which the computing networks is used. Some types of tasks may be better suited to certain types of computing networks and configuring the network to suit the task may result in benefits including greater network performance, stability, and/or security. The performance and security of an organization may be impacted based on the extent to which computing tasks of the organization may be performed on the network used by the organization. For example, a higher performance network with better security may result in greater user satisfaction for an organization's users.

Further, the tasks that a computing network is used for may change over time and a different type of network may be deployed to accommodate the different tasks performed on the network. The process of changing a network's topology may be arduous and require significant amounts of computational resources as well as manual intervention on the part of computing resource administrators and other personnel. Such excessive manual intervention and use of computational resources may result in excessive costs and expenditure of time that may be more profitably put to use in other areas. As a result, attempting to change a network's topology may present challenges.

SUMMARY

Aspects of the disclosure provide technical solutions to improve the effectiveness with which spine-leaf network topologies may be generated and deployed.

In accordance with one or more embodiments of the disclosure, quantum computing system for generating a spine-leaf network topology may comprise: a quantum computing device comprising a plurality of quantum gates configured to implement a generative adversarial network (GAN). The quantum computing system may further comprise a distributed ledger system comprising a blockchain. The blockchain may comprise a plurality of blocks. The quantum computing system may further comprise one or more deployment systems configured to access the blockchain and deploy a qualified candidate spine-leaf network topology. The quantum computing system may further comprise one or more processors; and memory storing computer-readable instructions that, when executed by the one or more processors, cause the quantum computing system to receive one or more prompts to generate a spine-leaf network topology based on a non-spine-leaf network topology of a non-spine-leaf network. The quantum computing system may generate, based on inputting the one or more prompts into one or more natural language processing (NLP) models configured to parse the one or more prompts, one or more network criteria for generating the spine-leaf network topology based on the non-spine-leaf network topology. The quantum computing system may retrieve, from the non-spine-leaf network topology, non-spine-leaf network topology data comprising network metadata, network dependency parameters, and network constraint parameters. The quantum computing system may generate, based on inputting the one or more network criteria and the non-spine-leaf network data into the GAN, a plurality of candidate spine-leaf network topologies. The quantum computing system may determine whether a qualified candidate spine-leaf network topology, of the plurality of candidate spine-leaf network topologies, meets the one or more network criteria. The quantum computing system may, based on the qualified candidate spine-leaf network topology meeting the one or more network criteria, generate a block of the blockchain. The block may comprise the qualified candidate spine-leaf network topology that meets the one or more network criteria.

In one or more implementations, the memory may store additional computer-readable instructions that, when executed by the one or more processors, further cause the computing system to access network topology training data comprising a plurality of historical non-spine-leaf network topologies. Each of the plurality of historical non-spine-leaf network topologies may comprise historical network metadata, historical network dependency parameters, and/or historical network constraint parameters. The computing system may generate, based on inputting the network topology training data into the GAN, a plurality of training spine-leaf network topologies. The computing system may determine a similarity between the plurality of training spine-leaf network topologies and a plurality of ground-truth spine-leaf network topologies. The computing system may generate, based on the similarity between the plurality of training candidate spine-leaf topologies and the plurality of ground-truth spine-leaf network topologies, a network topology accuracy of the GAN. The computing system may adjust a weighting of a plurality of network topology parameters of the GAN based on the network topology accuracy. The weighting of the plurality of network topology parameters that increase the network topology accuracy may be increased, and wherein the weighting of the plurality of network topology parameters that decrease the network topology accuracy may be decreased.

In one or more implementations, the network topology accuracy may be based on an amount of similarity between the plurality of training spine-leaf network topologies and the ground-truth spine-leaf network topologies.

In one or more implementations, the one or more network criteria may comprise one or more performance criteria, one or more resiliency criteria, one or more data redundancy criteria, and/or one or more security criteria.

In one or more implementations, the quantum computing device may be configured to generate quantum bits (qubits) based on highly entangled photons. Further, the quantum computing device may be configured to generate the plurality of candidate spine-leaf topologies based on passing the qubits through a plurality of quantum gates and detecting the output of the plurality of quantum gates.

In one or more implementations, the quantum computing device may comprise a quantum photonic computing device.

In one or more implementations, the one or more criteria may comprise a throughput threshold. Further, meeting the one or more network criteria may comprise a throughput of the qualified candidate spine-leaf network topology exceeding the throughput threshold.

In one or more implementations, the one or more criteria may comprise a latency threshold. Further, meeting the one or more network criteria may comprise a latency of the qualified candidate spine-leaf network topology being less than the latency threshold.

In one or more implementations, the one or more criteria may comprise a redundancy threshold. Further, meeting the one or more network criteria may comprise a redundancy of the qualified candidate spine-leaf network topology exceeding the redundancy threshold.

In one or more implementations, meeting the one or more network criteria comprise a performance of the qualified candidate spine-leaf network topology being a highest performance of the plurality of candidate spine-leaf topologies.

In one or more implementations, meeting the one or more network criteria may comprise a performance of the qualified candidate spine-leaf network topology being greater than the performance of the non-spine-leaf network topology.

In one or more implementations, the one or more NLP models comprise a large language machine learning model.

In one or more implementations, the block may comprise a smart contract comprising one or more instructions to deploy the qualified candidate spine-leaf network topology.

In one or more implementations, the block may comprise a smart contract that authorizes automatic deployment of the qualified candidate spine-leaf network topology if deployment of the qualified candidate spine-leaf network topology requires only software based changes to the non-spine-leaf network topology.

Corresponding methods (e.g., computer-implemented methods), apparatuses, devices, systems, and/or computer-readable media (e.g., non-transitory computer readable media) are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
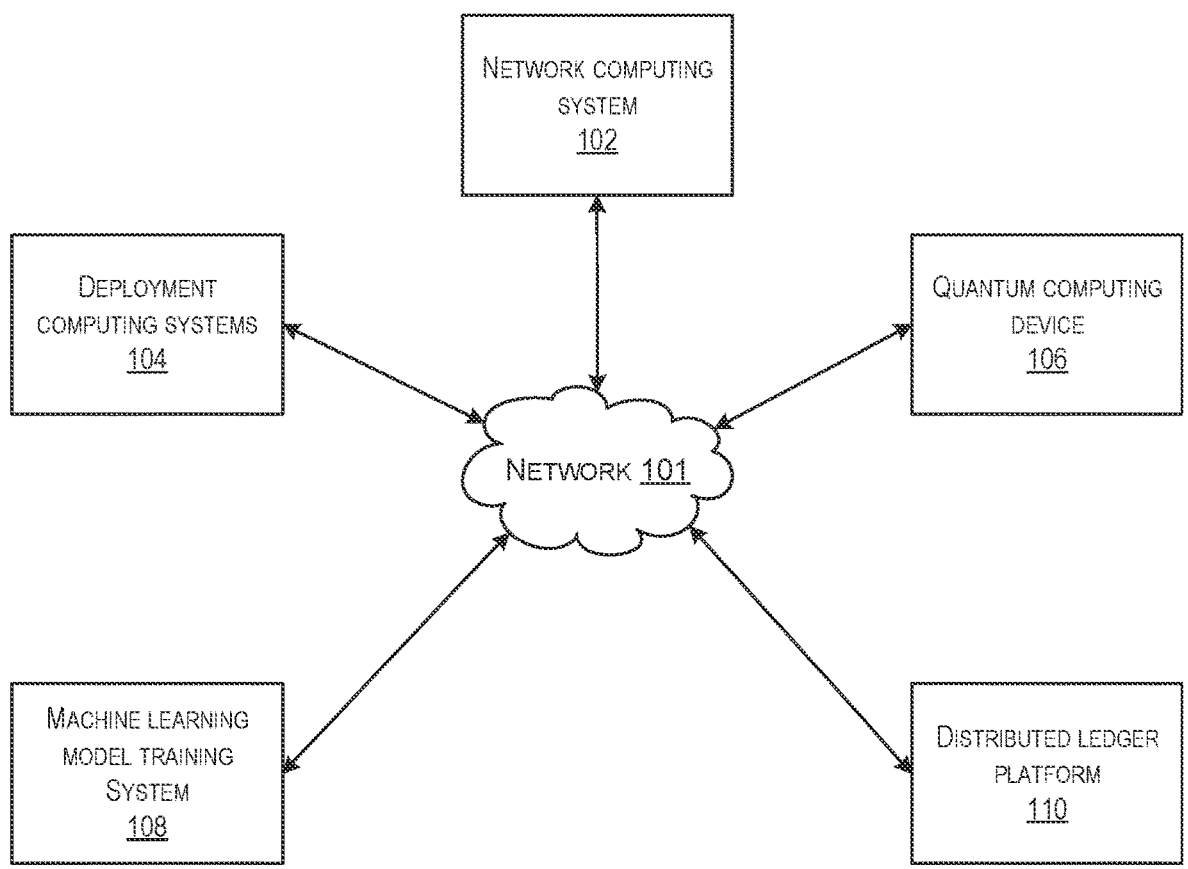
FIG. 1 depicts an illustrative computing environment for automated spine-leaf network topology generation and deployment in accordance with one or more aspects of the disclosure.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosed technology may relate to devices, systems, non-transitory computer readable media, and/or methods for generating a spine-leaf network topology that may be deployed on computing networks. Deployment of spine-leaf network topologies may provide advantages to networks including improved network resiliency and security. The disclosed technology may leverage the use of artificial intelligence (e.g., machine learning models) to analyze non-spine-leaf topology networks and generate spine-leaf topologies that may then be deployed.

Determining a network topology to deploy may be performed manually on an ad hoc basis. However, manual analysis of networks to generate more effective network topologies may be a complex task that uses significant computational resources in addition to being time consuming and required oversight by administrators and other trusted personnel. To reduce the time used to generate a network topology and improve the effectiveness of the network topologies that are generated, the disclosed technology may provide an artificial intelligence (e.g., machine learning model) algorithm based computing platform that may be implemented on a quantum photonic computing device. Use of a quantum photonic device that is uniquely configured to analyze network topologies may result in more rapid analysis of networks and more effective generation of spine-leaf network topologies. Further, the disclosed technology may automatically generate spine-leaf topologies that may be added to a blockchain that may be stored on a distributed ledger computing device that may be accessed by computing systems that may deploy the generated spine-leaf network topologies. Additionally, the disclosed computing technology may comprise a user friendly interface through which a user may provide prompts that may be used to analyze networks and generate a spine-leaf network topology that meets a user's requirements.

For example, a computing system (e.g., a quantum photonic computing platform) may receive prompts comprising network criteria for the deployment of a spine-leaf network topology based on a non-spine-leaf network topology. The prompts may be received by a machine learning model (e.g., a generative pretrained transformer (GPT) model) that is implemented on the computing system and configured to access and/or retrieve information (e.g., network metadata) from one or more non-spine-leaf networks based on the one or more prompts. The network criteria may comprise performance criteria (e.g., network throughput criteria), resiliency criteria (e.g., an extent to which the network may recover from failures), data redundancy criteria (e.g., an extent to which data of a network is backed up), and/or security criteria (e.g., encryption standards for a network, access protocols, authentication protocols, and/or authorization protocols for a network). For example, the one or more prompts may indicate particular computing systems (e.g., computing systems of a particular datacenter) to analyze based on a particular set of failure logs for the computing systems. Further, the one or more prompts may indicate the various criteria (e.g., network criteria) such as a required network throughput and/or network security standards. Based on the criteria, the computing system may extract, based on analysis of the non-spine-leaf network topology, non-spine-leaf network topology data. The non-spine-leaf network topology data may comprise network metadata, network dependency parameters and/or network constraint parameters of the non-spine-leaf network topology. The non-spine-leaf data may provide information about the overall structure of the non-spine-leaf network. Based on inputting the network criteria and the non-spine-leaf network topology data into a machine learning model (e.g., a generative adversarial network (GAN)) implemented on a quantum photonic computing device of the computing system, a plurality of candidate spine-leaf topologies may be generated by the GAN.

The quantum photonic computing device may comprise a plurality of quantum gates that are configured to implement a machine learning model (e.g., a GAN) and generate highly entangled quantum states based on input comprising a plurality of quantum bits (qubits) corresponding to the network criteria and/or the non-spine-leaf network topology data. Further, the quantum photonic computing device may be configured to generate a plurality of candidate spine-leaf topologies based on the highly entangled quantum states. The computing system may select, from the plurality of candidate spine-leaf topologies, a candidate spine-leaf topology that meets the network criteria. The computing system may then generate a block of a blockchain that is accessible to computing devices that are configured to deploy the spine-leaf topology. The block may comprise the qualified candidate spine-leaf topology that meets the network criteria. The blocks of the blockchain may be associated with smart contracts that comprise one or more rules that may be used to determine which computing systems may deploy the candidate spine-leaf topologies stored in the blocks of the blockchain. The qualified candidate spine-leaf topology may then be used to deploy a spine-leaf topology on a computing network.

The use of these techniques may result in a variety of benefits and advantages including a reduction in the time used to generate network topologies through use of machine learning models and/or quantum computing devices. Additionally, the disclosed technology may provide cost savings as well as improved network performance, security, redundancy, and/or resiliency.

FIG. 1 depicts an illustrative computing environment for automated spine-leaf network topology generation and deployment in accordance with one or more aspects of the disclosure. Referring to FIG. 1, computing environment 100 may include one or more computing systems. For example, computing environment 100 may include network computing system 102, deployment computing systems 104, quantum computing device 106, machine learning model training system 108, and/or distributed ledger platform 110.

As described further below, network computing system 102 may comprise a computing system that includes one or more computing devices (e.g., computing devices comprising one or more processors, one or more memory devices, one or more storage devices, and/or communication interfaces) that may be used to analyze currently deployed computing workloads (e.g., workloads that implement computing processes including the operation of computing applications such as computing software applications). For example, the network computing system 102 may be configured to implement one or more machine learning models that may be configured and/or trained to generate network criteria based on prompts, retrieve non-spine-leaf network data, and/or network criteria and/or generate spine-leaf network topologies.

In some implementations, the network computing system 102 may transmit data (e.g., a request to access non-spine-leaf network data) that may be used to access information (e.g., non-spine-leaf network data and/or network criteria) associated with the deployment computing systems 104 and/or the quantum computing device 106, machine learning model training system 108, and/or distributed ledger platform 110. The data transmitted by the network computing system 102 may be transmitted to deployment computing systems 104 and/or quantum computing device 106. Deployment computing systems 104 may be configured to grant access to the network computing system 102. For example, authorization to access the distributed ledger platform 110 may be restricted to authorized users of the network computing system 102 and/or the deployment computing systems 104 (e.g., an administrator with permission to access a blockchain stored on distributed ledger platform 110).

Communication between the network computing system 102, deployment computing systems 104, quantum computing device 106, the machine learning model training system 108, and/or distributed ledger platform 110 may be encrypted. In some embodiments, the network computing system 102 may access one or more computing devices and/or computing systems remotely. For example, the network computing system 102 may remotely access the deployment computing systems 104, the quantum computing device 106, the machine learning model training system 108, and/or the distributed ledger platform 110.

Deployment computing systems 104 may comprise one or more computing devices and/or one or more computing systems on which one or more network topologies (e.g., spine-leaf network topology) may be processed and/or deployed. Further, usage of the deployment computing systems 104 may be based on access granted to the network computing system 102. The deployment computing systems 104 may comprise different computing devices and/or computing systems that may provide different capabilities (e.g., faster processing, greater storage, and/or lower communication latency).

The deployment computing systems 104 may be located at a different physical location than the network computing system 102 and/or the quantum computing device 106. Although a single instance of the deployment computing systems 104 is shown, this is for illustrative purposes only, and any number of deployment computing systems 104 may be included in the computing environment 100 without departing from the scope of the disclosure.

Each of the one or more computing devices and/or one or more computing systems described herein may comprise one or more processors, one or more memory devices, one or more storage devices (e.g., one or more solid state drives (SSDs), one or more hard disk drives (HDDs), and/or one or more hybrid drives that incorporate SSDs, HDDs, and/or RAM), and/or a communication interface that may be used to send and/or receive data and/or perform operations including determining whether to grant access to a blockchain stored on distributed ledger platform 110. For example, the quantum computing device 106 may receive, from the network computing system 102, a request to process non-spine leaf network data and/or one or more criteria that may be used to generate a plurality of spine-leaf network topologies comprising a qualified candidate spine-leaf network topology.

In some implementations, quantum computing device 106 may include quantum computing components that may be used to generate qubits, process input comprising the qubits, and generate output comprising a plurality of spine-leaf network topologies comprising a qualified candidate spine-leaf network topology. In particular, quantum computing device 106 may comprise one or more processing devices and/or one or more storage devices as described herein.

Machine learning model training system 108 may comprise a computing system that includes one or more computing devices (e.g., servers, server blades, and/or the like) and/or other computer components (e.g., one or more processors, one or more memory devices, and/or one or more communication interfaces) that may be used to store training data that may be used to train one or more machine learning models. For example, the machine learning model training system 108 may store training data comprising one or more training instructions for the generation of network topologies comprising spine-leaf network topologies. One or more machine learning models stored and/or trained on the machine learning model training system 108 may include the one or more machine learning models on the network computing system 102. Further, the one or more machine learning models of the network computing system 102 may be trained and/or updated by the machine learning model training system 108.

Distributed ledger platform 110 may comprise a computing device and/or computing system that includes one or more computing devices (e.g., servers, server blades, or the like) and/or other computer components (e.g., processors, memories, communication interfaces) that may be used to generate, host, and/or otherwise maintain a distributed ledger (e.g., a blockchain, holochain, and/or other distributed ledger). In some implementations, the distributed ledger platform 110 may communicate with the network computing system 102, which may generate and/or add blocks to a blockchain stored on distributed ledger platform 110. Further, deployment computing system 104 may access blocks and/or blockchains stored on the distributed ledger platform 110. For example, the network computing system 102 may generate a block comprising a qualified candidate spine-leaf network topology. Further, deployment computing systems 104 may access the block comprising the qualified candidate spine-leaf network topology and deploy a network based on the qualified candidate spine-leaf network topology.

Computing environment 100 may include one or more networks, which may interconnect the network computing system 102, deployment computing systems 104, quantum computing device 106, and/or machine learning model training system 108, and/or distributed ledger platform 110. For example, computing environment 100 may include a network 101 which may interconnect, e.g., network computing system 102, deployment computing systems 104, quantum computing device 106, machine learning model training system 108, and/or distributed ledger platform 110. In some instances, the network 101 may be a 5G data network, and/or other data network.

In one or more arrangements, network computing system 102, deployment computing systems 104, quantum computing device 106, and/or machine learning model training system 108 may comprise one or more computing devices capable of sending and/or receiving data (e.g., non-spine-leaf network data and/or network criteria) and processing the data accordingly. For example, network computing system 102, deployment computing systems 104, quantum computing device 106, machine learning model training system 108 and/or the other systems included in computing environment 100 may, in some instances, include server computers, desktop computers, laptop computers, tablet computers, smart phones, or the like that may include one or more processors, one or more memory devices, communication interfaces, one or more storage devices, and/or other components.

Further, any combination of network computing system 102, quantum computing device 106, machine learning model training system 108, and/or distributed ledger platform 110 may, in some instances, be special-purpose computing devices configured to perform specific functions. For example, network computing system 102 may comprise one or more application specific integrated circuits (ASICs) that are configured to process one or more network criteria, non-spine-leaf network data network criteria, implement one or more machine learning models, and/or generate a plurality of spine-leaf network topologies.

Figure 2:
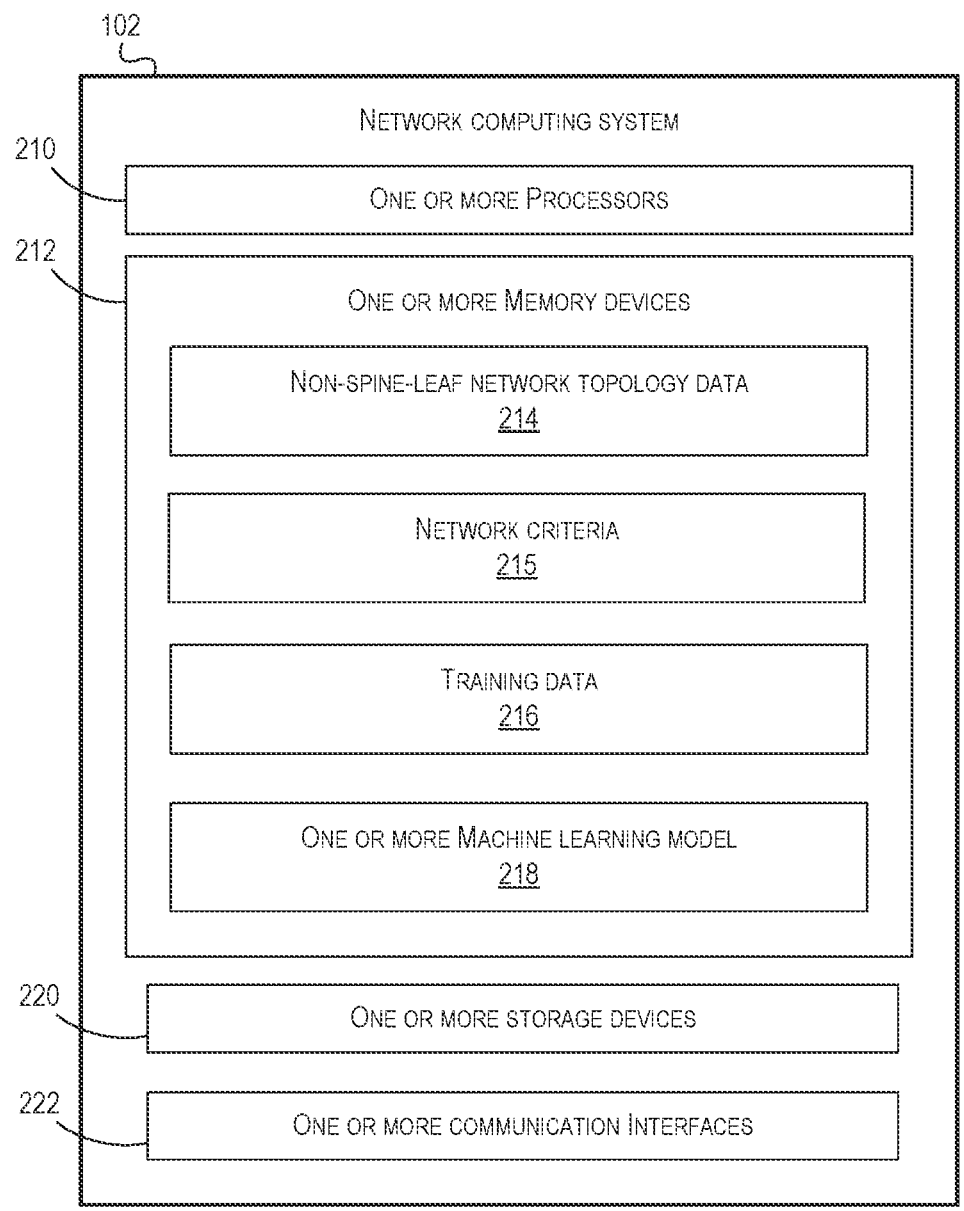
FIG. 2 depicts an illustrative computing system for automated spine-leaf network topology generation and deployment in accordance with one or more aspects of the disclosure.

FIG. 2 depicts an illustrative computing system for automated spine-leaf network topology generation and deployment in accordance with one or more aspects of the disclosure. Network computing system 102 may include one or more processors (e.g., processor 210), one or more memory devices 212, and a communication interface (e.g., one or more communication interfaces 222). A data bus may interconnect the processor 210, one or more memory devices 212, one or more storage devices 220, and/or one or more communication interfaces 222. One or more communication interfaces 222 may be configured to support communication between network computing system 102 and one or more networks (e.g., network 101, or the like). One or more communication interfaces 222 may be communicatively coupled to the one or more processor 210. The memory may include one or more program modules having instructions that when executed by one or more processor 210 may cause the network computing system 102 to perform one or more functions described herein and/or access data that may store and/or otherwise maintain information which may be used by such program modules and/or one or more processors 210.

The one or more memory devices 212 may comprise RAM. In some instances, the one or more program modules and/or databases may be stored by and/or maintained in different memory units of network computing system 102 and/or by different computing devices that may form and/or otherwise make up network computing system 102. For example, the memory may have, host, store, and/or include non-spine-leaf network data 214, network criteria 215, training data 216, and/or one or more machine learning models 218. One or more storage devices 220 (e.g., solid state drives and/or hard disk drives) may also be used to store data including the non-spine-leaf network data 214. The one or more storage devices 220 may comprise non-transitory computer readable media that may store data when the one or more storage devices 220 are in an active state (e.g., powered on) or an inactive state (e.g., sleeping or powered off).

Non-spine-leaf network data 214 may comprise data that indicates the state of one or more non-spine-leaf networks. The non-spine-leaf network data 214 may comprise network metadata, network dependency parameters, and/or network constraint parameters of one or more non-spine-leaf network topologies.

Network criteria 215 may comprise data that indicates criteria for a spine-leaf network topology. The network criteria 215 may comprise performance criteria, resiliency criteria, data redundancy criteria, and/or security criteria. The network criteria 215 may be used to select a qualified candidate spine-leaf network topology from a plurality of candidate spine-leaf network topologies.

Training data 216 may comprise historical data of network topologies comprising non-spine-leaf network topologies and/or spine-leaf network topologies. Training data 216 may be used to train one or more machine learning models (e.g., machine learning models 218). Further, training data 216 may be modified (e.g., some historical data may be added, deleted, and/or changed) over time. For example, new non-spine-leaf network data and/or new network criteria may be used to update the training data 216. Further, the training data may be periodically updated after new spine-leaf network topologies are generated.

One or more machine learning models 218 may implement, refine, train, maintain, and/or otherwise host an artificial intelligence model that may be used to process, analyze, evaluate, and/or generate data. For example, the one or more machine learning models 218 may process, analyze, and/or evaluate non-spine-leaf network data 214 and/or network criteria 215. Further, the one or more machine learning models 218 may generate output including a determination of a qualified candidate spine-leaf network topology that may be selected from a plurality of candidate spine-leaf network topologies based on network criteria. For example, a qualified candidate spine-leaf network topology may comprise a highest performing and highest security network topology selected from a plurality of candidate network topologies. Further, one or more machine learning models 218 may comprise one or more instructions that direct and/or cause the network computing system 102 to access the non-spine-leaf network data 214, access the network criteria 215, and/or perform other functions. Further, one or more machine learning models 218 may comprise a machine learning model that comprises one or more instructions to generate network criteria based on prompts as described herein.

Figure 3:
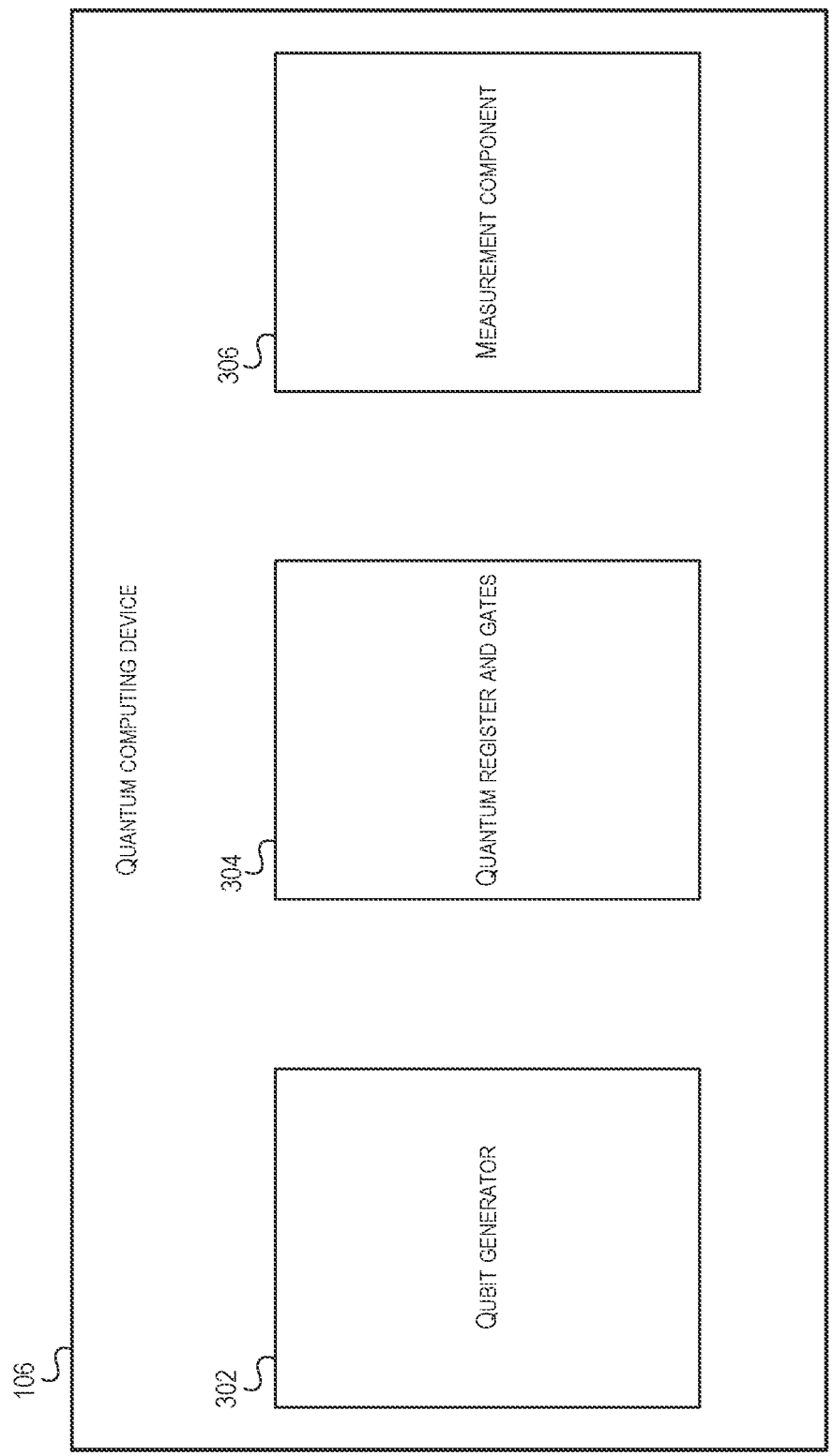
FIG. 3 depicts an illustrative quantum computing device for automated spine-leaf network topology generation in accordance with one or more aspects of the disclosure.

FIG. 3 depicts an illustrative quantum computing device for automated spine-leaf network topology generation in accordance with one or more aspects of the disclosure. Quantum computing device 106 may include the features and/or capabilities of network computing system 102. Quantum computing device 106 may comprise one or more processors, one or more memory devices, and a communication interface (not shown). A data bus may interconnect the processor, one or more memory devices, one or more storage devices, and/or one or more communication interfaces (not shown). One or more communication interfaces may be configured to support communication between quantum computing device 106 and network computing system 102 and/or one or more networks (e.g., network 101, or the like). One or more communication interfaces (not shown) may be communicatively coupled to the one or more processor. The memory may include one or more program modules having instructions that when executed by one or more processor may cause the quantum computing device 106 to perform one or more functions described herein and/or access data that may store and/or otherwise maintain information which may be used by such program modules and/or one or more processors. The one or more memory devices may comprise RAM. In some instances, the one or more program modules and/or databases may be stored by and/or maintained in different memory units of quantum computing device 106 and/or by different computing devices that may form and/or otherwise make up quantum computing device 106.

Quantum computing device 106 may comprise a qubit generator 302 that may be configured to generate a plurality of qubits. The qubits may be generated using superconducting circuits (e.g., Josephson junctions), nuclear magnetic resonance on molecules in a liquid state, and/or photonics. For example, an array of laser devices may be used to generate photons that are directed through the qubit generator 302. A quantum squeezing component of the qubit generator 302 may generate qubits based on generating squeezed superposition states of the photons. Quantum squeezing of the qubits may improve the detectability of the qubits by interferometers used in the quantum register and gates 304. The qubits may be sent to the quantum register and gates 304.

The quantum register and gates 304 may comprise an interferometer that may comprise beam splitters and/or phase shifters that may direct the photons to quantum registers and quantum gates. The quantum registers may be configured to store states of the qubits and the quantum gates may be configured to perform operations (e.g., generating the plurality of candidate spine-leaf network topologies). Further, the quantum gates of the quantum register and gates 304 may comprise quantum logic gates that may be used to perform operations. For example, the quantum logic gates may comprise identify gates, Pauli gates, phase shift gates, swap gates, Toffoli gates, Hadamard gates, and/or controlled gates. The quantum register and gates 304 may be configured based on input from the network computing system 102. For example, the quantum register and gates 304 may be configured to implement a GAN that is configured to generate the plurality of candidate spine-leaf network topologies based on one or more network criteria and/or non-spine-leaf network data as described herein. Further, the arrangement of quantum gates in the quantum register and gates 304 may be based on the arrangement of gates in the GAN implemented on a non-quantum computing device. The quantum register and gates 304 may generate output comprising highly entangled photons that may be received by measurement component 306.

Measurement component 306 may comprise photon detectors and may be configured to count the highly entangled photons outputted by the quantum register and gates 304. The measurement component 306 may be comprise a transition edge sensor that may be used to detect the highly entangled photons. Further, the measurement component 306 may be configured to analyze the highly entangled photons and generate an output that may be sent to the network computing system 102. For example, the measurement component may analyze the highly entangled photons and use an integer array to generate a plurality of spine-leaf network topologies comprising a qualified candidate spine-leaf network topology that meets one or more criteria (e.g., performance, security, redundancy, and/or resiliency criteria).

Figure 4:
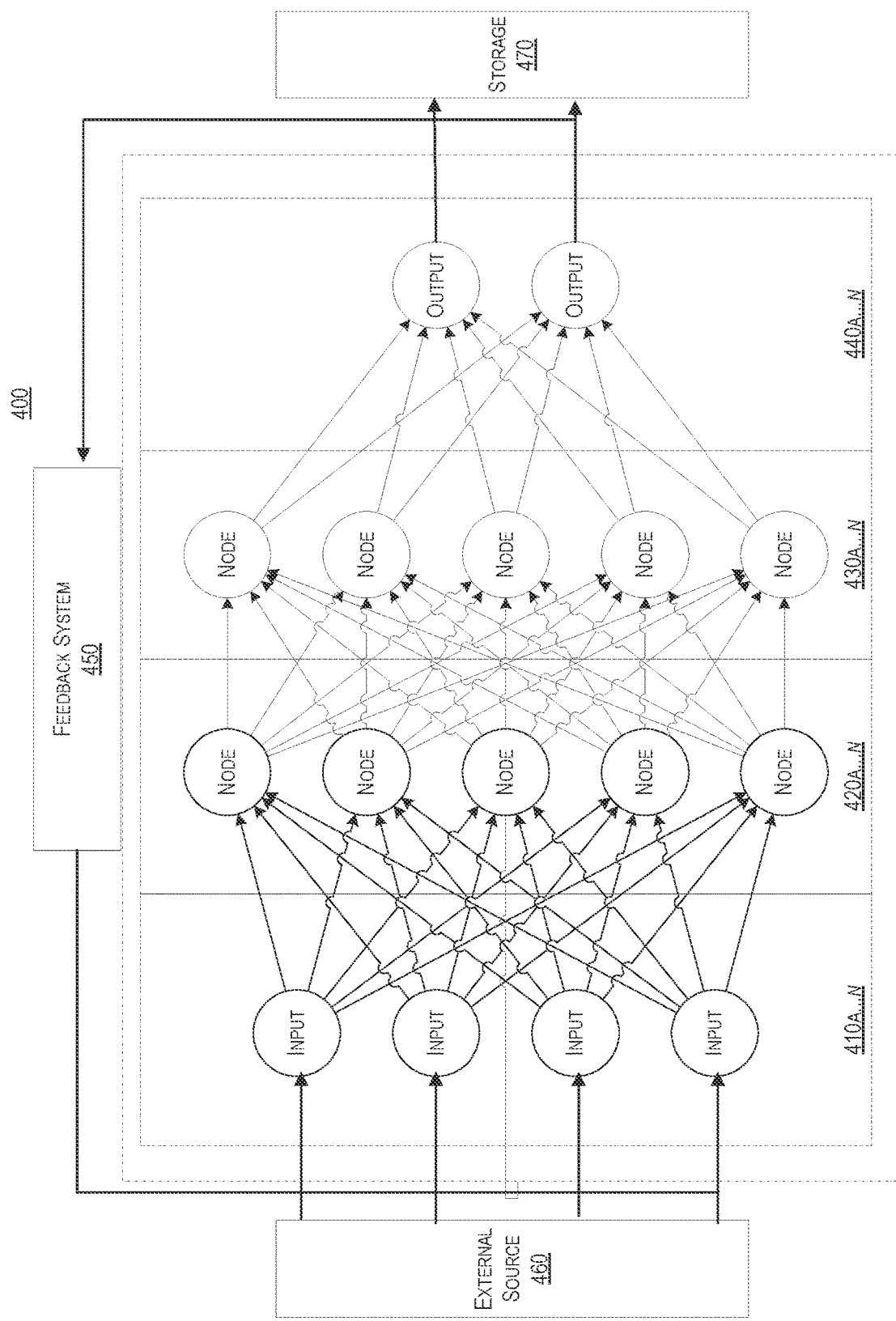
FIG. 4 depicts nodes of an illustrative artificial neural network on which a machine learning algorithm may be implemented in accordance with one or more aspects of the disclosure.

FIG. 4 depicts nodes of an illustrative artificial neural network on which a machine learning algorithm may be implemented in accordance with one or more aspects of the disclosure. In FIG. 4, each of input nodes 410*a-n* may be connected to a first set of processing nodes 420a-n. Each of the first set of processing nodes 420a-n may be connected to each of a second set of processing nodes 430a-n. Each of the second set of processing nodes 430a-n may be connected to each of output nodes 440a-n. Though only two sets of processing nodes are shown, any number of processing nodes may be implemented. Similarly, though only four input nodes, five processing nodes, and two output nodes per set are shown in FIG. 4, any number of nodes may be implemented per set. Data flows in FIG. 4 are depicted from left to right: data may be input into an input node, may flow through one or more processing nodes, and may be output by an output node. Input into the input nodes 410a-n may originate from an external source 460. Output may be sent to a feedback system 450 and/or to storage 470. The feedback system 450 may send output to the input nodes 410a-n for successive processing iterations with the same or different input data.

In one illustrative method using feedback system 450, the system may use machine learning to determine an output. The output may include regression output, confidence values, and/or classification output. For example, the output may include a plurality of candidate spine-leaf topologies comprising a qualified candidate spine-leaf network topology that meets one or more network criteria. The system may use any machine learning model including one or more generative adversarial networks (GANs), XGBoosted decision trees, auto-encoders, perceptron, decision trees, support vector machines, regression, and/or a neural network. The neural network may be any type of neural network including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tan h function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting— regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially. In one example, optimization comprises minimizing the number of false positives to maximize a user's experience. Alternatively, an optimization function may minimize the number of missed positives to optimize minimization of losses.

In one example, FIG. 4 depicts nodes that may perform various types of processing, such as discrete computations, computer programs, and/or mathematical functions implemented by a computing device. For example, the input nodes 410a-n may comprise logical inputs of different data sources, such as one or more data servers. The processing nodes 420a-n may comprise parallel processes executing on multiple servers in a data center. And, the output nodes 440a-n may be the logical outputs that ultimately are stored in results data stores, such as the same or different data servers as for the input nodes 410a-n. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 400 may learn and/or be dynamically reconfigured. Though nodes are depicted as having connections only to successive nodes in FIG. 4, connections may be formed between any nodes. For example, one processing node may be configured to send output to a previous processing node.

Input received in the input nodes 410a-n may be processed through processing nodes, such as the first set of processing nodes 420a-n and the second set of processing nodes 430a-n. The processing may result in output in output nodes 440a-n. As depicted by the connections from the first set of processing nodes 420a-n and the second set of processing nodes 430a-n, processing may comprise multiple steps or sequences. For example, the first set of processing nodes 420a-n may be a rough data filter, whereas the second set of processing nodes 430a-n may be a more detailed data filter.

The artificial neural network 400 may be configured to effectuate decision-making. As a simplified example for the purposes of explanation, the artificial neural network 400 may be configured to generate data (e.g., one or more network criteria and/or a plurality of candidate spine-leaf network topologies) and/or instructions (e.g., instructions to deploy a network topology). The input nodes 410a-n may be provided with one or more prompts, one or more network criteria, and/or non-spine-leaf network data. The first set of processing nodes 420a-n may be each configured to perform specific steps to analyze the one or more network criteria and/or non-spine-leaf network data, such as determining the performance and/or security of non-spine leaf network topologies. The second set of processing nodes 430a-n may be each configured to determine the performance and/or security of spine-leaf network topologies that may be generated based on the non-spine-leaf network topologies. Multiple subsequent sets may further refine this processing, each looking for further more specific tasks, with each node performing some form of processing which need not necessarily operate in the furtherance of that task. The artificial neural network 400 may then execute or cause to be executed operations that generate a plurality of spine-leaf network topologies comprising a qualified candidate spine-leaf network topology that meets one or more criteria.

The feedback system 450 may be configured to determine the accuracy of the artificial neural network 400. Feedback may comprise an indication of similarity between the value of an output generated by the artificial neural network 400 and a ground-truth value. For example, in the spine-leaf network topology generation example provided above, the feedback system 450 may be configured to determine the spine-leaf network topologies that meet one or more criteria and may include the selection of a qualified candidate spine-leaf network topology that optimally meets the one or more network criteria when compared to the other generated spine-leaf network topologies.

The feedback system 450 may already have access to the ground-truth data (e.g., an optimized spine-leaf network topology), such that the feedback system may train the artificial neural network 400 by indicating the accuracy of the output generated by the artificial neural network 400. The feedback system 450 may comprise human input, such as an administrator indicating to the artificial neural network 400 whether it made a correct decision. The feedback system may provide feedback (e.g., an indication of whether the previous output was correct or incorrect and/or an extent to which the generated spine-leaf network topologies are similar to the ground-truth spine-leaf network topologies) to the artificial neural network 400 via input nodes 410a-n or may transmit such information to one or more nodes. The feedback system 450 may additionally or alternatively be coupled to the storage 470 such that output is stored. The feedback system may not have correct answers at all, but instead base feedback on further processing: for example, the feedback system may comprise a system programmed to analyze and/or validate non-spine-leaf network data, such that the feedback allows the artificial neural network 400 to compare its results to that of a manually programmed system.

The artificial neural network 400 may be dynamically modified to learn and provide better input. Based on, for example, previous input and output and feedback from the feedback system 450, the artificial neural network 400 may modify itself. For example, processing in nodes may change and/or connections may be weighted differently. Additionally or alternatively, the node may be reconfigured to process non-spine-leaf network data differently. The modifications may be predictions and/or guesses by the artificial neural network 400, such that the artificial neural network 400 may vary its nodes and connections to test hypotheses.

The artificial neural network 400 need not have a set number of processing nodes or number of sets of processing nodes, but may increase or decrease its complexity. For example, the artificial neural network 400 may determine that one or more processing nodes are unnecessary or should be repurposed, and either discard or reconfigure the processing nodes on that basis. As another example, the artificial neural network 400 may determine that further processing of all or part of the input is required and add additional processing nodes and/or sets of processing nodes on that basis.

The feedback provided by the feedback system 450 may be mere reinforcement (e.g., providing an indication that output is correct or incorrect, awarding the machine learning algorithm a number of points, or the like) or may be specific (e.g., providing the correct output). The artificial neural network 400 may be supported or replaced by other forms of machine learning. For example, one or more of the nodes of artificial neural network 400 may implement a decision tree, associational rule set, logic programming, regression model, cluster analysis mechanisms, Bayesian network, propositional formulae, generative models, and/or other algorithms or forms of decision-making. The artificial neural network 400 may effectuate deep learning. In some implementations, the artificial neural network 400 may receive input including one or more input features. The one or more input features may comprise information associated with a number and/or type network topologies.

Figure 5:
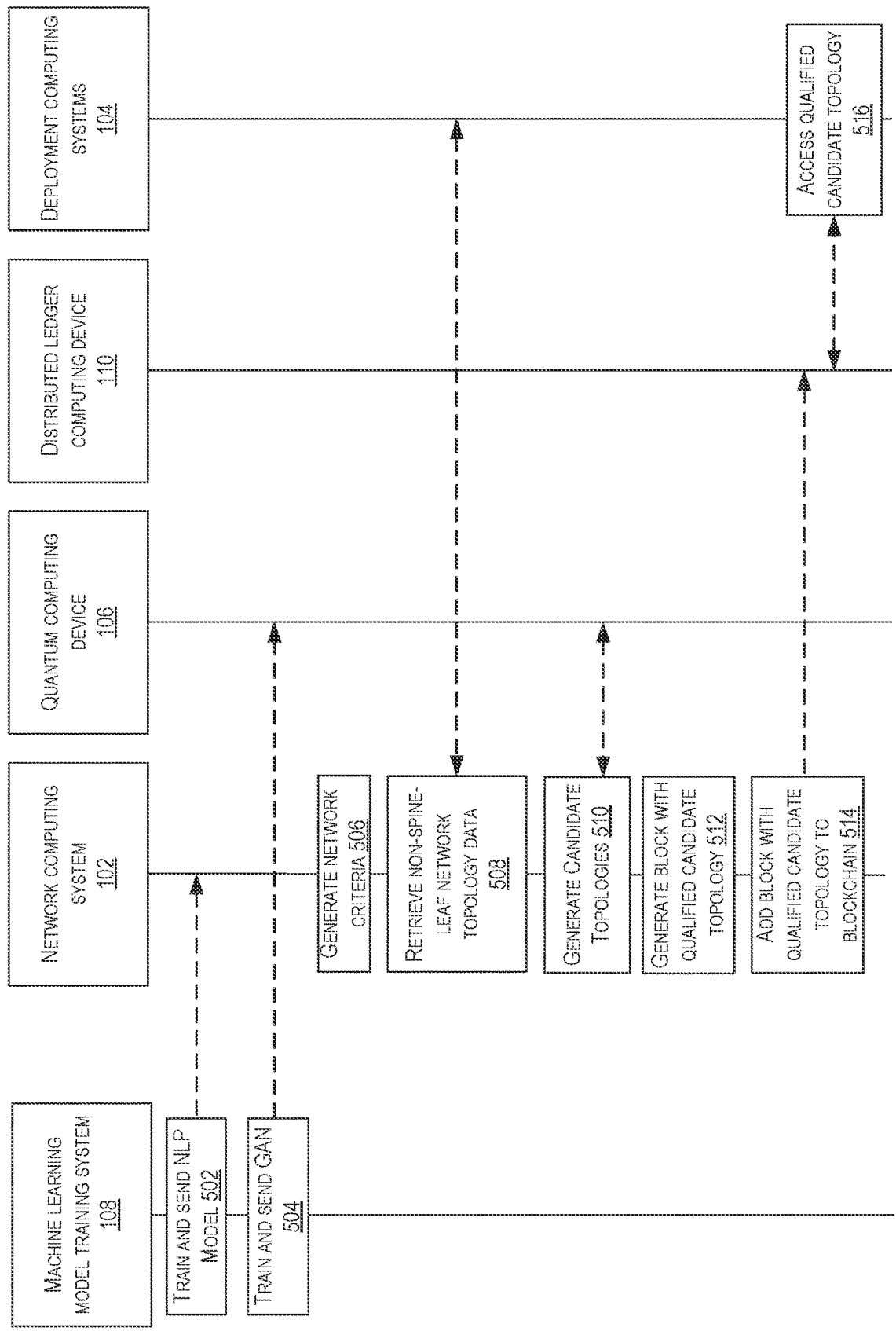
FIG. 5 depicts an illustrative event sequence for automated spine-leaf network topology generation in accordance with one or more aspects of the disclosure.

FIG. 5 depicts an illustrative event sequence for automated spine-leaf network topology generation in accordance with one or more aspects of the disclosure. Referring to FIG. 5, at step 502, a machine learning model training system 108 may train one or more machine learning models (e.g., a natural language processing model) to parse one or more prompts and generate one or more network criteria for generating a spine-leaf network topology based on a non-spine-leaf network topology. The machine learning model training system may then send the one or more trained machine learning models to network computing system 102 which may implement the one or more trained machine learning models (e.g., implement the NLP model).

At step 504, a machine learning model training system 108 may train one or more machine learning models (e.g., a generative adversarial network) to generate, based on input comprising one or more network criteria and/or non-spine-leaf network data into the one or more machine learning models, a plurality of candidate spine-leaf network topologies comprising a qualified candidate spine-leaf network topology that meets one or more network criteria. The machine learning model training system may then send the one or more trained machine learning models to quantum computing device 106 which may implement the one or more trained machine learning models (e.g., implement the GAN).

In some embodiments, network computing system 102 may periodically establish a data connection with the machine learning model training system 108 in order to receive up to date copies of one or more machine learning models (e.g., the one or more machine learning models 218 described with respect to FIG. 2 and/or the artificial neural network 400 that is described with respect to FIG. 4) that may be used to parse one or more prompts and generate one or more network criteria as described herein. In some instances, the machine learning model training system 108 may determine whether the network computing system 102 has an updated copy of the one or more machine learning models and may send an indication to the network computing system 102 if an update is not warranted at that time.

At step 506, the network computing system 102 may generate one or more network criteria that may be used to select a spine-leaf network topology. The one or more network criteria may be based on one or more prompts that may be inputted into the NLP model sent to the network computing system 102 in step 502.

At step 508, the network computing system 102 may retrieve non-spine-leaf network data. The non-spine-leaf network topology data may be stored locally and retrieved from the network computing system 102. Further, the non-spine-leaf network data may be retrieved from one or more deployment computing systems 104. Retrieval of the non-spine-leaf network data from the one or more deployment computing systems 104 may be based on a request access and retrieve data from one or more deployment computing systems 104. As described herein, the non-spine-leaf network data may comprise network metadata, network dependency parameters, and/or network constraint parameters.

At step 510, the network computing system 102 may send the non-spine-leaf network topology data to quantum computing device 106, which may generate a plurality of candidate spine-leaf network topologies which may comprise a qualified candidate spine-leaf network topology that meets the one or more network criteria. The quantum computing device 106 may send the plurality of candidate spine-leaf network topologies comprising a qualified candidate spine-leaf network topology to the network computing system 102.

At step 512, the network computing system 102 may generate a block that may be added to a blockchain stored on distributed ledger platform 110. The block may comprise the qualified candidate spine-leaf network topology. At step 514, the network computing system 102 may add the block with the qualified candidate spine-leaf network topology to the blockchain stored on distributed ledger platform 110.

At step 516, the deployment computing systems 104 may access the blockchain stored on the distributed ledger platform 110. The deployment computing systems 104 may then use the qualified candidate spine-leaf network topology in the deployment and/or migration of a computing network. In some embodiments, the blockchain may be encrypted and keys to decrypt blocks of the blockchain may be distributed to authorized entities.

Figure 6:
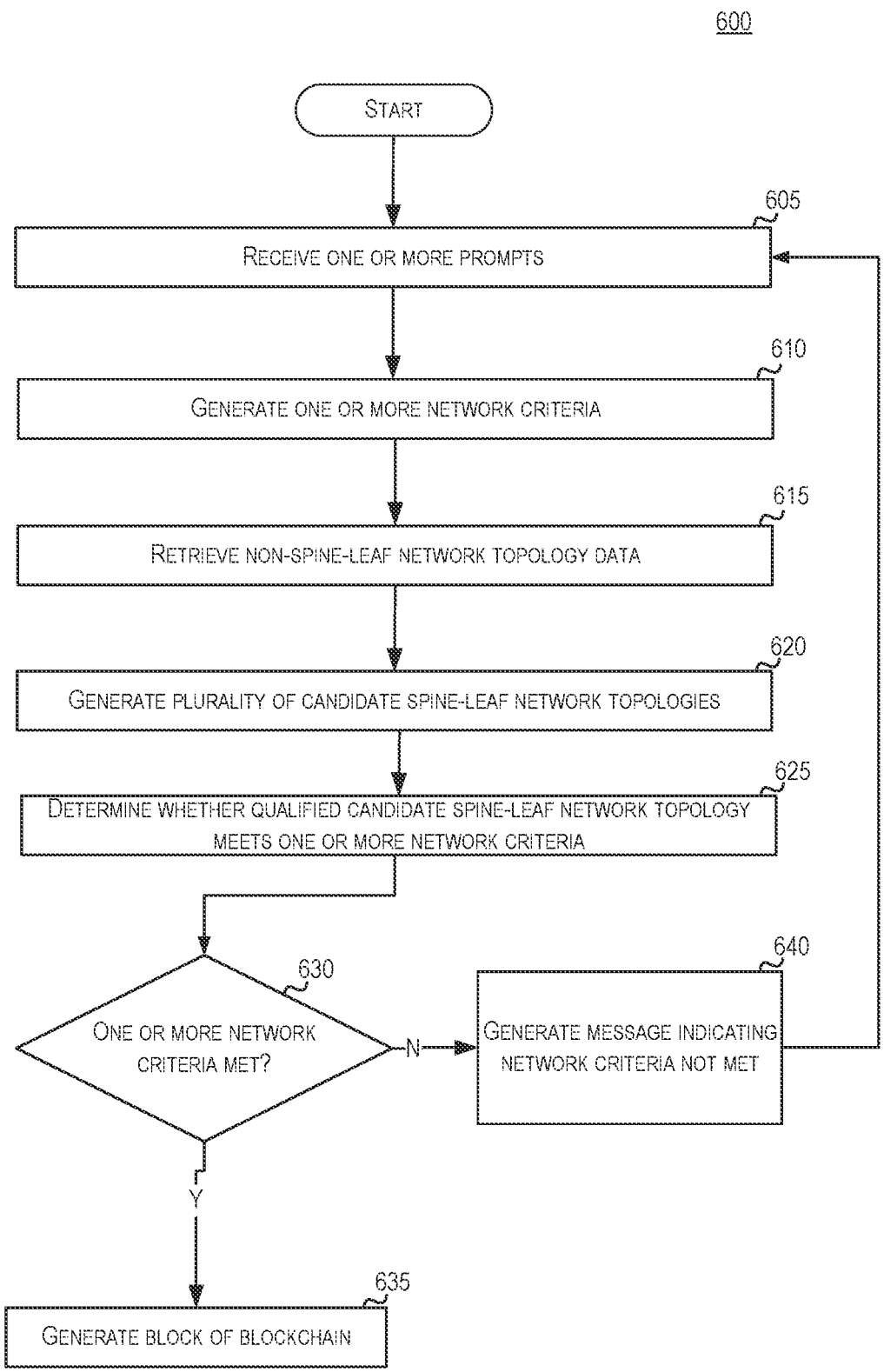
FIG. 6 depicts an illustrative method for automatically generating a spine-leaf network topology in accordance with one or more aspects of the disclosure.

FIG. 6 depicts an illustrative method for automatically generating a spine-leaf network topology in accordance with one or more aspects of the disclosure. The steps of a method 600 for automatically generating a spine-leaf network topology may be implemented by a computing device or computing system (e.g., the network computing system 102) in accordance with the computing devices and/or computing systems described herein. One or more of the steps described with respect to FIG. 6 may be omitted, performed in a different order, and/or modified. Further, one or more other steps (e.g., the steps described with respect to FIG. 7) may be added to the steps described with respect to FIG. 6.

At step 605, a computing system may receive one or more prompts. The one or more prompts may comprise one or more prompts to generate a spine-leaf network topology based on a non-spine-leaf network topology of a non-spine-leaf network. For example, a user interface of the network computing system 102 may be configured to receive one or more text based prompts and/or one or more voice based prompts via the user interface. The one or more prompts may for example comprise a set of requirements (e.g., security requirements and/or performance requirements) for a network topology. Further, the one or more prompts may comprise a number of devices to include in a topology, types of devices to include in a topology, types of software applications to use in the topology, and/or an existing set of devices and/or applications that may be used to deploy the topology. For example, a user may specify that an existing network configuration with certain devices and software applications may be used as the basis for generating a spine-leaf network topology.

At step 610, a computing system may generate, based on inputting the one or more prompts into one or more natural language processing (NLP) models configured to parse the one or more prompts, one or more network criteria for generating the spine-leaf network topology based on the non-spine-leaf network topology. For example, the network computing system 102 may input the non-spine-leaf network data into one or more machine learning models 218, which may be configured and/or trained to generate one or more network criteria for generating the spine-leaf network topology based on the non-spine-leaf network topology. The one or more network criteria may comprise one or more performance criteria (e.g., a threshold network bandwidth), one or more resiliency criteria (e.g., an threshold time to failover the network), one or more data redundancy criteria (e.g., a certain number of devices in the topology that are designated as redundant), and/or one or more security criteria (e.g., a minimum level of encryption for the network and/or the use of certain types of secure servers at some nodes of the topology).

At step 615, a computing system may retrieve non-spine-leaf network topology data comprising network metadata, network dependency parameters, and network constraint parameters. The non-spine-leaf network topology data may be retrieved from the non-spine-leaf network topology. For example, the non-spine-leaf network topology data may be retrieved by scanning an existing non-spine-leaf network and retrieving the non-spine-leaf network topology data from nodes of the non-spine-leaf network. The network metadata may comprise indications of the network protocols being used in a network, devices used in the network, network payloads, data sources, and/or data destinations. The network dependency parameters may indicate the nodes (e.g., devices) that are connected to each node of the network and which nodes require other nodes to operate and/or communicate data. The network constraint parameters may indicate constraints of the networks including bandwidth, throughput, and/or latency constraints. By way of example, a computing system (e.g., the network computing system 102) may retrieve non-spine-leaf network data from local storage or from a remote computing system (e.g., one or more of deployment computing systems 104).

At step 620, a computing system may generate, based on inputting the one or more network criteria and/or the non-spine-leaf network data into the GAN, a plurality of candidate spine-leaf network topologies. For example, the network computing system 102 may input the one or more network criteria and/or non-spine-leaf network data into one or more machine learning models 218, which may be configured and/or trained to generate the plurality of candidate spine-leaf network topologies. Generating the plurality of candidate spine-leaf network topologies may comprise generating a plurality of simulations of the candidate spine-leaf network topologies based on the network criteria and/or the non-spine-leaf network data. For example, the GAN may generate millions of spine-leaf network topologies using different network metadata, network dependency parameters, and network constraint parameters.

The GAN may be implemented on a quantum computing device (e.g., a quantum photonic computing device) that may be configured to generate the plurality of candidate spine-leaf network topologies. The quantum computing device may be configured to generate highly entangled quantum states based on input comprising a plurality of quantum bits (qubits) corresponding to the one or more network criteria and non-spine-leaf network topology data. The quantum computing device may be configured to generate the plurality of candidate spine-leaf topologies based on the highly entangled quantum states. The qubits allow the quantum computing device to represent a greater number of spine-leaf network topologies than the same number of bits of a non-quantum computing device. For example, sixteen bits of a non-quantum computing device may represent a single number from 0-65,535. In comparison, sixteen qubits may store all of the numbers between 0 and 65,535. As a result, for certain types of operations a quantum computing device may provide significantly greater performance than a non-quantum computing device.

At step 625, the computing system may determine whether a qualified candidate spine-leaf network topology of the plurality of candidate spine-leaf network topologies meets the one or more network criteria. For example, the network computing system 102 may analyze the plurality of candidate spine-leaf network topologies to determine whether a qualified candidate spine-leaf network topology meets the one or more network criteria. By way of further example, the GAN may be configured to determine the qualified candidate spine-leaf network topology that meets the one or more network criteria (e.g., the GAN may mark the qualified candidate spine-leaf network topology that met the one or more network criteria in order to distinguish it from the other candidate spine-leaf network topologies that did not meet the one or more network criteria).

The one or more network criteria may comprise a throughput threshold. Further, meeting the one or more network criteria may comprise a throughput of the qualified candidate spine-leaf network topology exceeding the throughput threshold. For example, a qualified candidate spine-leaf network topology may meet the one or more network criteria by exceeding the throughput and having a throughput that is greater than the other candidate spine-leaf network topologies and the non-spine leaf network topology.

The one or more criteria may comprise a latency threshold. Further, meeting the one or more network criteria may comprise a latency of the qualified candidate spine-leaf network topology being less than the latency threshold. For example, a qualified candidate spine-leaf network topology may meet the one or more network criteria by having a latency that is less than the latency threshold and having a latency that is also lower than the latency of the other candidate spine-leaf network topologies and the non-spine leaf network topology.

The one or more criteria may comprise a redundancy threshold. Further, meeting the one or more network criteria may comprise a redundancy of the qualified candidate spine-leaf network topology exceeding the redundancy threshold. The redundancy threshold may comprise a number of redundant devices and/or a proportion of the total size of the spine-leaf network topology (e.g., twenty percent of the devices in network topology may be redundant). For example, a qualified candidate spine-leaf network topology may meet the one or more network criteria by exceeding the redundancy threshold and having a redundancy that is greater than the other candidate spine-leaf network topologies and the non-spine leaf network topology.

The one or more network criteria may comprise a performance of the qualified candidate spine-leaf network topology being a highest performance of the plurality of candidate spine-leaf topologies. For example, the qualified candidate spine-leaf network topology may have the highest throughput and the lowest latency of the plurality of candidate spine-leaf network topologies.

Meeting the one or more network criteria may comprise a performance of the qualified candidate spine-leaf network topology being greater than the performance of the non-spine-leaf network topology. For example, the qualified candidate spine-leaf network topology may be compared to the non-spine-leaf network topology. Determining whether the one or more criteria have been met may comprise generating network topology scores based on a predicted performance, security, redundancy, and/or resilience of the non-spine-leaf network topology and each of the plurality of candidate spine-leaf network topologies. The one or more criteria may be weighted. For example, security may be more heavily weighted than performance and/or performance may be more heavily weighted than redundancy. The qualified candidate spine-leaf network topology may be the topology that has a higher score than the non-spine-leaf network topology and the other candidate spine-leaf network topologies.

At step 630, the computing system may, based on a qualified candidate spine-leaf network topology of the plurality of spine-leaf network topologies meeting the one or more network criteria, perform step 635. For example, a computing system (e.g., the network computing system 102) may determine that a qualified candidate spine-leaf network topology of the plurality of candidate spine-leaf network topologies meets the one or more network criteria based on the qualified candidate spine-leaf network topology having the highest network topology score.

Based on a qualified candidate spine-leaf network topology of the plurality of spine-leaf network topologies not meeting the one or more network criteria, the computing system may perform step 640. For example, a computing system (e.g., the network computing system 102) may determine whether a qualified candidate spine-leaf network topology of the plurality of candidate spine-leaf network topologies meets the one or more network criteria. For example, determining whether the one or more criteria have been met may comprise generating network topology scores based on a predicted performance, security, redundancy, and/or resilience of the non-spine-leaf network topology and each of the plurality of candidate spine-leaf network topologies. The plurality of spine-leaf network topologies may have lower scores than the non-spine-leaf network topology.

At step 635, a computing system may generate a block of a blockchain. The block may comprise the qualified candidate spine-leaf network topology that meets the one or more network criteria. For example, the network computing system 102 may generate a block that comprises a smart contract that may comprise instructions to deploy the qualified candidate spine-leaf network topology to an authorized entity. Further, the network computing system 102 may add the block to the blockchain stored in distributed ledger platform 110.

In some embodiments, the smart contract may authorize the automatic deployment of the qualified candidate spine-leaf network topology if deployment of the qualified candidate spine-leaf network topology requires only software based changes to the non-spine-leaf network topology. For example, the network computing system 102 may determine that the qualified candidate spine-leaf network topology may be implemented without having to add, remove, and/or modify physical computing devices and may be performed using only changes to software applications. Based on not requiring the addition, removal, and/or modification of physical computing devices, the smart contract may authorize automatic deployment of the qualified candidate spine-leaf network topology to an authorized entity (e.g., a network administrator or other individual authorized to access the blockchain).

In some embodiments, the qualified candidate spine-leaf network topology may be deployed in response to the determination that a failover condition has been met. For example, the qualified candidate spine-leaf network topology may be a backup to an existing network topology and may be deployed if the existing network topology meets a failover condition. Further, the qualified candidate spine-leaf network topology may be deployed in order to implement a patch in an existing network topology. For example, the one or more network criteria may comprise a set of devices that may be affected by a software patch and the qualified candidate spine-leaf network topology may comprise a network topology that would allow the patch to be deployed with minimal interruption in the operation of the network.

At step 640, a computing system may generate indications of the plurality of candidate spine-leaf network topologies not meeting the one or more network criteria. For example, the network computing system 102 may generate a message indicating "A MORE OPTIMAL NETWORK CONFIGURATION WAS NOT GENERATED" that may be displayed on a display device of the network computing system 102. In some embodiments, the computing system may perform step 605 after completing performance of step 635.

Figure 7:
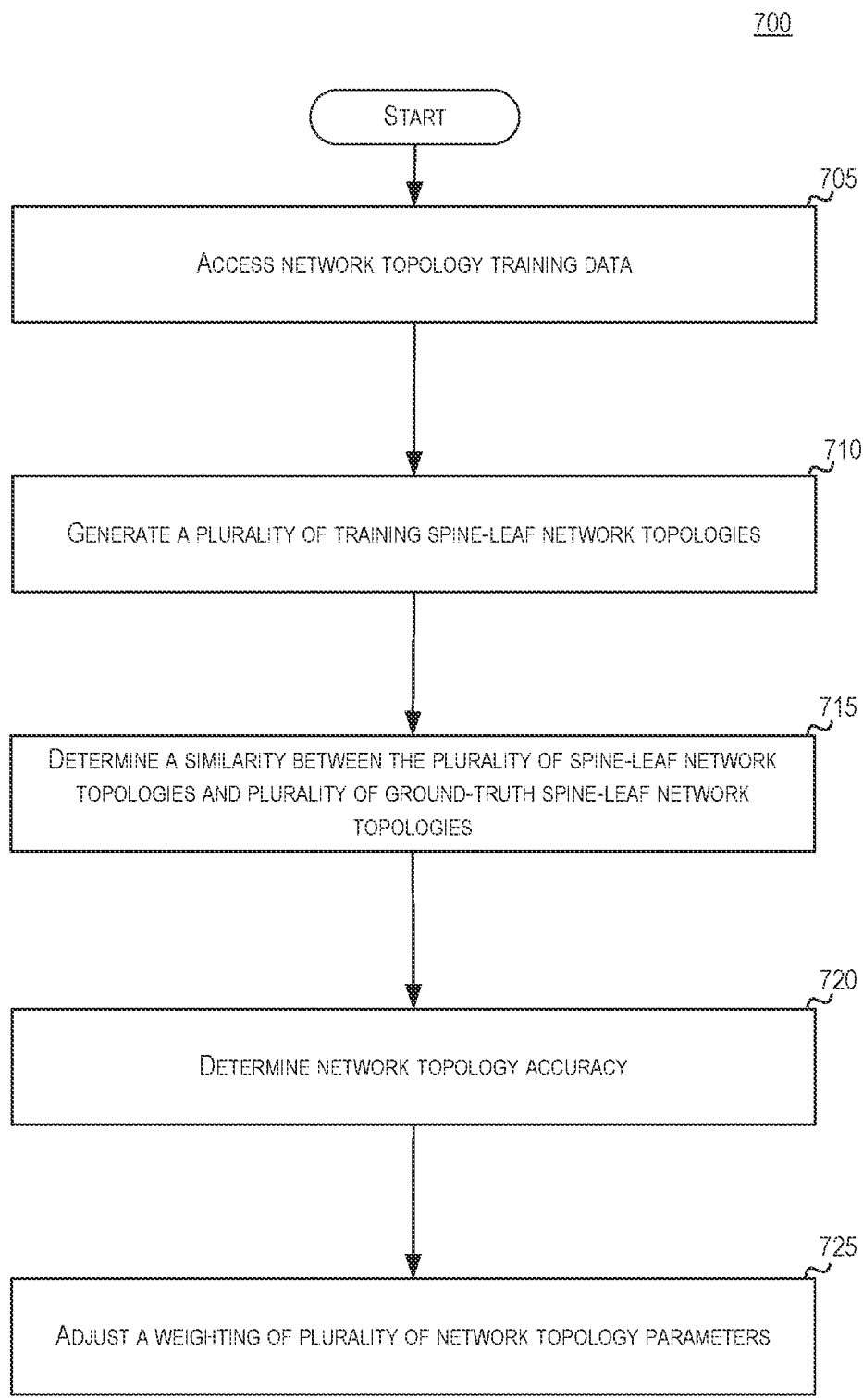
FIG. 7 depicts an illustrative method for automatically training a machine learning model to generate spine-leaf network topologies in accordance with one or more aspects of the disclosure.

FIG. 7 depicts an illustrative method for automatically training a machine learning model to generate spine-leaf network topologies in accordance with one or more aspects of the disclosure. The steps of a method 700 for automatically training a machine learning model to automatically generate spine-leaf network topologies may be implemented by a computing device or computing system (e.g., the network computing system 102) in accordance with the computing devices and/or computing systems described herein. One or more of the steps described with respect to FIG. 7 may be omitted, performed in a different order, and/or modified. Further, one or more other steps (e.g., the steps described with respect to FIG. 6) may be added to the steps described with respect to FIG. 7.

At step 705, a computing system may access network topology training data. The network topology training data may comprise a plurality of historical non-spine-leaf network topologies. Each of the plurality of historical non-spine-leaf network topologies may comprise historical network metadata, historical network dependency parameters, and/or historical network constraint parameters. The historical network metadata may be similar to the network metadata described herein and may comprise previous metadata of existing network topologies. The historical network dependency parameters may be similar to the network dependency parameters described herein and may comprise previous network dependency parameters of existing network topologies. The historical network constraint parameters may be similar to the network constraint parameters described herein and may comprise previous network constraint parameters of existing network topologies. The network topology training data may be stored in a storage device of the machine learning model training system 108 or a remote storage system and may be accessed by the machine learning model training system 108 in order to train and/or retrain a machine learning model.

At step 710, a computing system may generate a plurality of training spine-leaf network topologies. Generating the plurality of training spine-leaf network topologies may be based on inputting the network topology training data into the one or more machine learning models (e.g., the GAN described herein). The one or more machine learning models may comprise the features and/or capabilities of machine learning models described herein including the machine learning models described with respect to FIG. 4. For example, network topology training data may be inputted into a GAN that is implemented on the machine learning model training system 108. The one or more machine learning models of the machine learning model training system 108 may be configured and/or trained to receive the network topology training data and perform one or more operations including analyzing the plurality of historical non-spine-leaf network topologies. Further, the one or more machine learning models may generate a plurality of training spine-leaf network topologies. For example, the plurality of training spine-leaf network topologies may comprise different spine-leaf networks with different combinations of computing devices and/or computing applications.

At step 715, a computing system may determine similarities between the plurality of training spine-leaf network topologies and a plurality of ground-truth training spine-leaf network topologies. Determination of the similarities between the plurality of training spine-leaf network topologies and the plurality of ground-truth training spine-leaf network topologies may be based on one or more comparisons of the plurality of training spine-leaf network topologies to the plurality of ground-truth spine-leaf network topologies. For example, the machine learning model training system may compare metrics of the plurality of training spine-leaf network topologies to metrics of the plurality of ground-truth spine-leaf network topologies. The metrics may comprise one or more performance metrics, one or more security metrics, one or more redundancy metrics, and/or one or more resiliency metrics. The plurality of ground-truth spine-leaf network topologies may meet one or more network criteria associated with the metrics. For example, the plurality of ground-truth spine-leaf network topologies may have a certain level of redundancy (e.g., a proportion of the network that is redundant) that meets one or more network criteria for redundancy. The comparison of a training spine-leaf network topology to a ground-truth spine-leaf network topology based on the same non-spine-leaf network topology may comprise a comparison of the respective levels of redundancy.

At step 720, a computing system may generate, based on the similarity between the plurality of training spine-leaf network topologies and the plurality of ground-truth spine-leaf network topologies, a network topology accuracy of the one or more machine learning models. Generation of the network topology accuracy may be based on an extent to which the training spine-leaf network topologies are similar to a ground-truth training spine-leaf network topologies.

For example, if the plurality of training spine-leaf network topologies and the plurality of ground-truth spine-leaf network topologies are similar (e.g., the performance, security, redundancy, and/or resiliency metric of the training spine-leaf network topologies match the ground-truth spine-leaf network topologies or are within a threshold range of similarity) then the similarity may be determined to be high. If the plurality of training spine-leaf network topologies are dissimilar (e.g., the performance, security, redundancy, and/or resiliency metric of the training spine-leaf network topologies do not match the ground-truth spine-leaf network topologies or are not within a threshold range of similarity) from the plurality of ground-truth training spine-leaf network topologies the similarity may be determined to be low. The network topology accuracy may be positively correlated with the similarity between the plurality of training spine-leaf network topologies and the ground-truth training spine-leaf network topologies. Further, the network topology accuracy may be based on an amount of similarities between the plurality of training spine-leaf network topologies and the ground-truth spine-leaf network topologies.

A greater number of similarities between the plurality of training spine-leaf network topologies and the ground-truth spine-leaf network topologies may be positively correlated with a higher network topology accuracy. A score or other value may be generated to indicate the network topology accuracy. For example, a numerical score between zero and one hundred may be generated. The score may be positively correlated with the training spine-leaf network topologies accuracy and greater similarities between the plurality of training spine-leaf network topologies and the plurality of ground-truth training spine-leaf network topologies may be positively correlated with a higher score.

At step 725, a computing system may adjust a weighting of a plurality of network topology parameters of the one or more machine learning models based on the network topology accuracy. For example, the machine learning model training system 108 may increase the weight of the plurality of network topology parameters that were determined to increase the network topology accuracy and/or decrease the weight of the plurality of network topology parameters that were determined to decrease the network topology accuracy. Further, some of the plurality of network topology parameters may be more heavily weighted than other network topology parameters. The weighting of the plurality of network topology parameters may be positively correlated with the extent to which the plurality of network topology parameters contribute to increasing the network topology accuracy. For example, network security parameters may be weighted more heavily than network redundancy parameters and/or network performance parameters may be weighted more heavily than network resiliency parameters.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A network computing system for generating a spine-leaf network topology, the network computing system comprising:
    a quantum computing device comprising a plurality of quantum gates configured to implement a generative adversarial network (GAN);
    a distributed ledger system comprising a blockchain, wherein the blockchain comprises a plurality of blocks;
    one or more deployment systems configured to access the blockchain and deploy a qualified candidate spine-leaf network topology;
    one or more processors; and
    memory storing computer-readable instructions that, when executed by the one or more processors, cause the quantum computing system to:
    receive one or more prompts to generate a spine-leaf network topology based on a non-spine-leaf network topology of a non-spine-leaf network;
    generate, based on inputting the one or more prompts into one or more natural language processing (NLP) models configured to parse the one or more prompts, one or more network criteria for generating the spine-leaf network topology based on the non-spine-leaf network topology;

retrieve, from the non-spine-leaf network topology, non-spine-leaf network topology data comprising network metadata, network dependency parameters, and network constraint parameters;

generate, based on inputting the one or more network criteria and the non-spine-leaf network topology data into the GAN, a plurality of candidate spine-leaf network topologies;

determine whether the qualified candidate spine-leaf network topology, of the plurality of candidate spine-leaf network topologies, meets the one or more network criteria; and based on the qualified candidate spine-leaf network topology meeting the one or more network criteria, generate a block of the blockchain, wherein the block comprises the qualified candidate spine-leaf network topology that meets the one or more network criteria.

2. The computing system of claim 1, wherein the quantum computing device is configured to generate quantum bits (qubits) based on highly entangled photons, and wherein the quantum computing device is further configured to generate the plurality of candidate spine-leaf network topologies based on passing the qubits through a plurality of quantum gates and detecting output of the plurality of quantum gates.

3. The computing system of claim 1, wherein the quantum computing device comprises a quantum photonic computing device.

4. The computing system of claim 1, wherein the one or more network criteria comprise a throughput threshold, and wherein the meeting the one or more network criteria comprises a throughput of the qualified candidate spine-leaf network topology exceeding the throughput threshold.

5. The computing system of claim 1, wherein the one or more network criteria comprise a latency threshold, and wherein the meeting the one or more network criteria comprises a latency of the qualified candidate spine-leaf network topology being less than the latency threshold.

6. The computing system of claim 1, wherein the one or more network criteria comprise a redundancy threshold, and wherein the meeting the one or more network criteria comprises a redundancy of the qualified candidate spine-leaf network topology exceeding a redundancy threshold.

7. The computing system of claim 1, wherein the meeting the one or more network criteria comprises a performance of the qualified candidate spine-leaf network topology being a highest performance of the plurality of candidate spine-leaf network topologies.

8. The computing system of claim 1, wherein the meeting the one or more network criteria comprises a performance of the qualified candidate spine-leaf network topology being greater than the performance of the non-spine-leaf network topology.

9. The computing system of claim 1, wherein the one or more NLP models comprise a large language machine learning model.

10. The computing system of claim 1, wherein the block comprises a smart contract comprising one or more instructions to deploy the qualified candidate spine-leaf network topology.

11. The computing system of claim 1, wherein the block comprises a smart contract that authorizes automatic deployment of the qualified candidate spine-leaf network topology if deployment of the qualified candidate spine-leaf network topology requires only software based changes to the non-spine-leaf network topology.

12. The computing system of claim 1, wherein the memory stores additional computer-readable instructions that, when executed by the one or more processors, further cause the computing system to:

access network topology training data comprising a plurality of historical non-spine-leaf network topologies, wherein each of the plurality of historical non-spine-leaf network topologies comprises historical network metadata, historical network dependency parameters, and historical network constraint parameters;

generate, based on inputting the network topology training data into the GAN, a plurality of training spine-leaf network topologies;

determine a similarity between the plurality of training spine-leaf network topologies and a plurality of ground-truth spine-leaf network topologies;

generate, based on the similarity between the plurality of training candidate spine-leaf topologies and the plurality of ground-truth spine-leaf network topologies, a network topology accuracy of the GAN; and adjust a weighting of a plurality of network topology parameters of the GAN based on the network topology accuracy, wherein the weighting of the plurality of network topology parameters that increase the network topology accuracy is increased, and wherein the weighting of the plurality of network topology parameters that decrease the network topology accuracy is decreased.

13. The computing system of claim 12, wherein the network topology accuracy is based on an amount of similarity between the plurality of training spine-leaf network topologies and the ground-truth spine-leaf network topologies.

14. The computing system of claim 1, wherein the one or more network criteria comprise one or more performance criteria, one or more resiliency criteria, one or more data redundancy criteria, or one or more security criteria.

15. A method of generating a spine-leaf network topology, the method comprising:

receiving, by a quantum computing device comprising one or more processors, one or more prompts to generate a spine-leaf network topology based on a non-spine-leaf network topology of a non-spine-leaf network;

generating, by the computing device, based on inputting the one or more prompts into one or more natural language processing (NLP) models configured to parse the one or more prompts, one or more network criteria for generating the spine-leaf network topology based on the non-spine-leaf network topology;

retrieving, by the computing device, from the non-spine-leaf network topology, non-spine-leaf network topology data comprising network metadata, network dependency parameters, and network constraint parameters;

generating, by the computing device, based on inputting the one or more network criteria and the non-spine-leaf network topology data into a GAN, a plurality of candidate spine-leaf network topologies;

determining, by the computing device, whether a qualified candidate spine-leaf network topology, of the plurality of candidate spine-leaf network topologies, meets the one or more network criteria; and based on the qualified candidate spine-leaf network topology meeting the one or more network criteria, generating, by the computing device, a block of a blockchain, wherein the block comprises the qualified candidate spine-leaf network topology that meets the one or more network criteria.

16. The method of claim 15, wherein the quantum computing device is configured to generate quantum bits (qubits) based on highly entangled photons, and wherein the quantum computing device is further configured to generate the plurality of candidate spine-leaf network topologies based on passing the qubits through a plurality of quantum gates and detecting output of the plurality of quantum gates.

17. The method of claim 15, wherein the meeting the one or more network criteria comprises a throughput of the qualified candidate spine-leaf network topology exceeding a throughput threshold.

18. The method of claim 15, wherein the meeting the one or more network criteria comprises a latency of the qualified candidate spine-leaf network topology being less than a latency threshold.

19. The method of claim 15, wherein the meeting the one or more network criteria comprises a redundancy of the qualified candidate spine-leaf network topology exceeding a redundancy threshold.

20. One or more non-transitory computer-readable comprising instructions that, when executed by a computing platform comprising at least one processor, a communication interface, a quantum computing device, and memory, cause the computing platform to:

receive one or more prompts to generate a spine-leaf network topology based on a non-spine-leaf network topology of a non-spine-leaf network;

generate, based on inputting the one or more prompts into one or more natural language processing (NLP) models configured to parse the one or more prompts, one or more network criteria for generating the spine-leaf network topology based on the non-spine-leaf network topology;

retrieve, from the non-spine-leaf network topology, non-spine-leaf network topology data comprising network metadata, network dependency parameters, and network constraint parameters;

generate, based on inputting the one or more network criteria and the non-spine-leaf network topology data into a GAN, a plurality of candidate spine-leaf network topologies;

determine whether a qualified candidate spine-leaf network topology, of the plurality of candidate spine-leaf network topologies, meets the one or more network criteria; and based on the qualified candidate spine-leaf network topology meeting the one or more network criteria, generate a block of a blockchain, wherein the block comprises the qualified candidate spine-leaf network topology that meets the one or more network criteria.

* * * * *